United States Patent
Yakobson et al.

(10) Patent No.: US 8,146,368 B2
(45) Date of Patent: Apr. 3, 2012

(54) METHOD FOR PROVIDING AUXILIARY POWER TO AN ELECTRIC POWER PLANT USING FISCHER TROPSCH TECHNOLOGY

(75) Inventors: Dennis L. Yakobson, Arvada, CO (US); Claude C. Corkadel, III, Steamboat Springs, CO (US); Charles B. Benham, Arvada, CO (US); Belma Demirel, Longmont, CO (US); Peter S. Pedersen, Boulder, CO (US)

(73) Assignee: Rentech, Inc., Los Angeles, CA (US)

( * ) Notice: Subject to any disclaimer, the term of this patent is extended or adjusted under 35 U.S.C. 154(b) by 130 days.

(21) Appl. No.: 12/628,975

(22) Filed: Dec. 1, 2009

(65) Prior Publication Data

US 2010/0109338 A1 May 6, 2010

Related U.S. Application Data

(62) Division of application No. 11/316,455, filed on Dec. 21, 2005, now Pat. No. 7,644,587.

(51) Int. Cl.
*F02C 3/28* (2006.01)
*F02C 6/14* (2006.01)
(52) U.S. Cl. ............................................ 60/781; 60/780
(58) Field of Classification Search .................. 60/780, 60/781, 772, 39.12, 39.464
See application file for complete search history.

(56) References Cited

U.S. PATENT DOCUMENTS

| 3,986,349 | A | | 10/1976 | Egan | |
|---|---|---|---|---|---|
| 4,092,825 | A | * | 6/1978 | Egan | 60/781 |
| 4,341,069 | A | * | 7/1982 | Bell et al. | 60/781 |
| 4,524,581 | A | * | 6/1985 | Cascone et al. | 60/781 |
| 5,543,437 | A | | 8/1996 | Benham | |
| 6,233,940 | B1 | | 5/2001 | Uji | |
| 6,306,917 | B1 | | 10/2001 | Bohn | |
| 6,664,302 | B2 | | 12/2003 | French | |
| 6,673,845 | B2 | | 1/2004 | Price | |
| 6,786,050 | B1 | * | 9/2004 | Okada et al. | 60/780 |
| 6,897,577 | B2 | * | 5/2005 | Weeber et al. | 290/52 |
| 6,976,362 | B2 | | 12/2005 | Sheppard | |
| 7,114,566 | B2 | | 10/2006 | Vinegar et al. | |
| 2005/0092483 | A1 | | 5/2005 | Vinegar et al. | |
| 2006/0096298 | A1 | | 5/2006 | Barnicki | |

OTHER PUBLICATIONS

International Search Report and Written Opinion dated Sep. 12, 2007 issued in corresponding Application No. PCT/US06/62313.
Office Action dated Apr. 1, 2010 issued by the Chinese Patent Office in corresponding Application No. 200680048932.7 with English language summary.
Australian Office Action dated February 1, 2011 for corresponding Australian Application No. 2006330602 (2 pgs.).

* cited by examiner

*Primary Examiner* — Ted Kim
(74) *Attorney, Agent, or Firm* — Timothy S. Westby; Porter Hedges LLP

(57) ABSTRACT

A method for meeting both base-load and peak-load demand in a power production facility. By integrating a Fischer-Tropsch (FT) hydrocarbon production facility with an electrical power generating facility, peak-load power demand can be met by reducing the temperature of the FT reactor thereby increasing the quantity of tail gases and using FT tail gases to fuel a gas turbine generator set. The method enables rapid power response and allows the synthesis gas generating units and the FT units to operate with constant flow rates.

15 Claims, 2 Drawing Sheets

METHOD FOR PROVIDING AUXILIARY POWER TO AN ELECTRIC POWER PLANT USING FISCHER TROPSCH TECHNOLOGY

CROSS-REFERENCE TO RELATED APPLICATIONS

This application is a divisional application which claims the benefit under 35 U.S.C. §121 of U.S. patent application Ser. No. 11/316,455, filed Dec. 21, 2005, now U.S. Pat. No. 7,644,587, the disclosure of which is hereby incorporated herein by reference.

STATEMENT REGARDING FEDERALLY SPONSORED RESEARCH OR DEVELOPMENT

Not Applicable.

BACKGROUND

Technical Field

One issue confronting electrical power generating utilities is the rapid variability in demand during the day. Also, with the increasing use of alternate power sources by utilities such as wind and solar energy, there can be rapid variability in power generation. Power variances can prove problematic. For example, inability to meet peak demands and alternate source reductions can lead to "brown-outs" and/or "black-outs". Another disadvantage faced by utilities involves paying a premium for electrical power purchased during peak load hours.

Peaking power plants must have a rapid response capability to match a rapidly changing demand and/or interruptions in supply. Although gas turbines have the ability to provide the rapid response required by peaking plants in about 1 to about 3 hours, they generally require a clean fuel. A clean gaseous fuel can be provided by the tail gases from a Fischer-Tropsch (FT) process.

In contrast to the method described in U.S. Pat. No. 5,543,437 (Benham et al) whereby the FT reactor synthesis gas flow rate, and hence production rate, was varied to accommodate a varying power demand, the instant method permits the FT reactor to operate at a constant synthesis gas flow rate.

U.S. Pat. No. 3,986,349 (Egan) teaches an integrated process for generating electrical power using gasification of solid carbonaceous material and FT technology. Gases from the gasifier and tail gases from the FT system are used in a power plant to produce base-load power. Liquid hydrocarbons from the FT system are stored and used as fuel in a gas turbine-generator set to provide supplemental power for peak-load demand.

Benham U.S. Pat. No. 5,543,437 contemplates the use of FT processes in combination with electric power generating facilities. When a fuel source for a steam power plant is obtained from coal or natural gas, the '437 patent suggests a variation in power production by changing the firing rate of the boilers. When the fuel source is from gas produced by a coal gasification facility, the '437 patent suggests adding an alternative use for the excess coal gas during off-peak hours. The alternate use can then be "turned down" when most of the gas is required for peak power production. An alternate use is a slurry-phase FT reactor for producing liquid hydrocarbons from the coal gas. Thus, the coal gasification facility supplies sufficient gas to meet peak electric load requirements while a minimum flow of gas is supplied to one or more FT reactors to produce liquid hydrocarbons during off-peak hours. In the change from peak-load operation to off-peak operation, coal gas is diverted from the boiler to the FT reactors and the pressure in the FT reactors is reduced to reduce the density of the coal gas and thereby increase the superficial velocity of the gas in the slurry FT reactor. During peak power production, the liquid hydrocarbon production rate of the slurry FT reactors drops.

SUMMARY

The present method integrates a FT hydrocarbon production facility with an electrical power generating facility. In addition to meeting peak-load demands, the methodology can also produce a part of the base load requirement. For example, for power produced from a wind energy system or other alternative energy system which is subject to wide variability in energy source during the day, the present method can be used to "smooth out" power production with time. A gasifier provides a constant supply of synthesis gas to one or more FT reactors. Tail gases and optionally naphtha from the FT units provide fuel for one or more gas turbine-generator sets.

In the disclosed method, variable electrical power generation is achieved by increasing or decreasing the amount of FT tail gases supplied to the gas turbine-generator sets. The amount of tail gases can be adjusted by varying the operating temperature of the FT reactors. Using this technique, not only can the gasifier operate under constant conditions, but the flow rate of synthesis gas to the FT reactors can be continuous. Also, there is a potential of generating much greater power by using tail gases and naphtha from low-temperature FT operation than the power generated by using FT liquids alone.

Feedstocks useful for gasification comprise coal, petroleum coke, saw dust, agricultural wastes, sewage sludge and energy crops. Almost any feedstock containing carbon can be used in the process to produce a clean synthesis gas for fueling a combined cycle system and for reacting in a FT system.

The gasification reaction, i.e. partial oxidation reaction, can be expressed as:

$$CH_z + 0.5O_2 \rightarrow z/2 H_2 + CO \quad (1)$$

where z is the H:C ratio of a feedstock and it is assumed that the amount of any other species produced in the gasification reaction is negligible.

The water gas shift reaction also takes place:

$$H_2O + CO \leftrightarrow H_2 + CO_2 \quad (2)$$

If x represents the number of moles of water reacted per mole of carbon in the feedstock, then equations 1 and 2 can be combined to give:

$$CH_z + 0.5O_2 + xH_2O \rightarrow (x+z/2)H_2 + (1-x)CO + xCO_2 \quad (3)$$

The desired $H_2$:CO ratio exiting the gasifier dictates the amount of water reacted with the feedstock. For example, if r represents the desired $H_2$:CO ratio, then $$x = (r - z/2)/(1 + r) \quad (4)$$

The FT reaction for each carbon number can be expressed as:

$$(2n - f + 1)H_2 + nCO \rightarrow (1-f)C_nH_{2n+2} + fC_nH_{2n} + nH_2O, \quad (5)$$

where f represents the fraction of olefins for carbon number n. For n=1, f=0. For an iron based catalyst the water gas shift reaction is also active:

$$H_2O + CO \leftrightarrow H_2 + CO_2 \quad (6)$$

The present method provides rapid response power to a power plant for meeting peak demand.

The present method may also provide rapid response power to compensate for variability of alternate sources of power such as wind generators and solar cells.

In addition, the present method produces synthesis gas using a gasifier operating under constant conditions, which provides a continuous flow of synthesis gas for use in FT and power operations.

The present method can produce variable amounts of FT tail gases and naphtha by operating the FT reactors at variable temperatures.

The present method uses a gas turbine for driving a generator to achieve rapid startup and shutdown for meeting peak power demands or fluctuating power production.

These and other features and advantages of the disclosed method reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION

Figure 1:
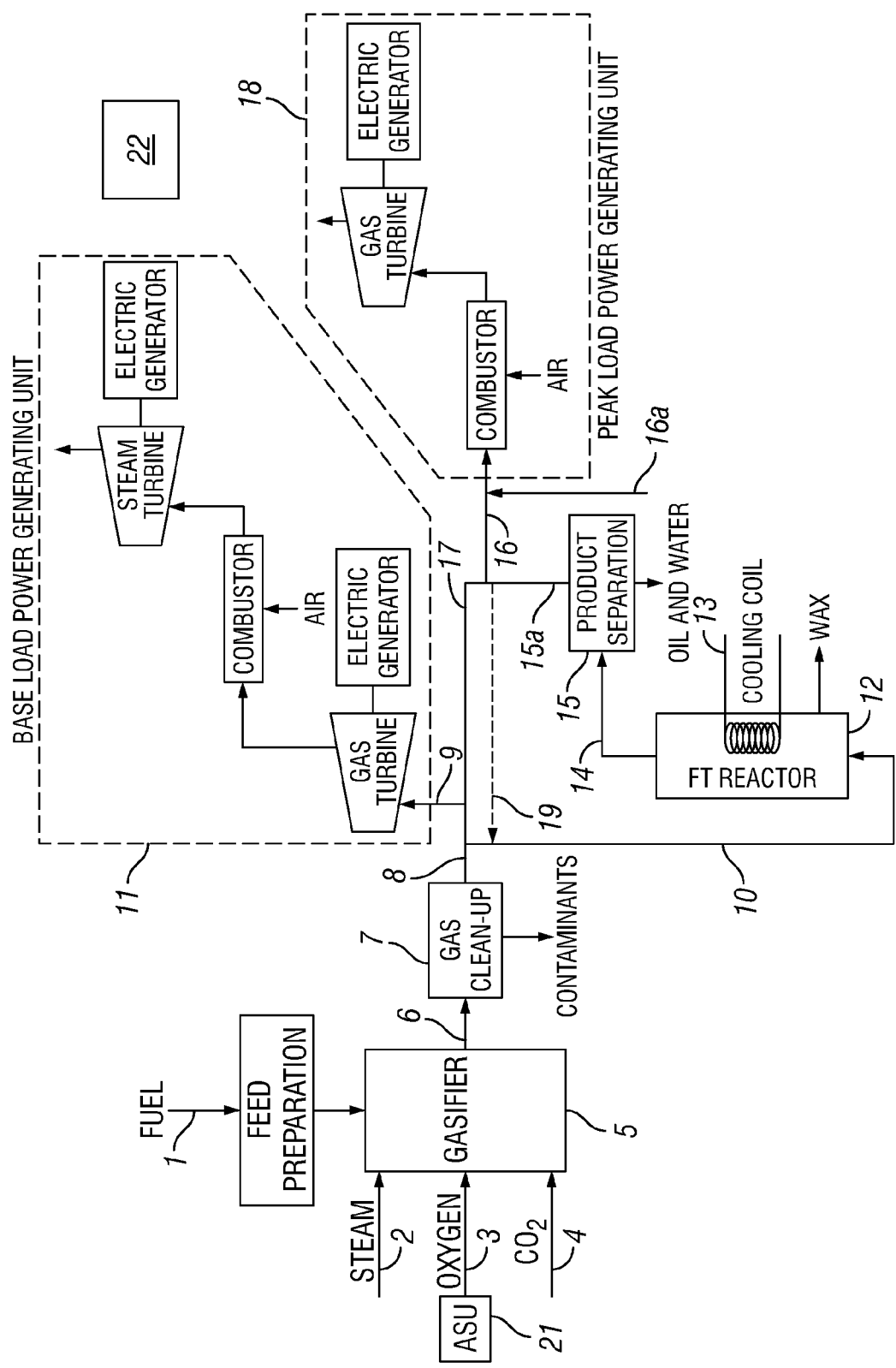
FIG. 1 is a diagram of an integrated Fischer-Tropsch plant and electrical power generating plant.

FIG. 1 is a diagram of an integrated FT plant and electrical power generating plant. In the disclosed process of FIG. 1, fuel 1, and oxidizing gas selected from one or more of steam 2, oxygen 3, and carbon dioxide 4 are fed to synthesis gas generating unit 5. Oxygen may be provided by air separation unit 21. Synthesis gas 6 is fed to gas cleanup unit 7 to remove contaminants such as sulfur, chlorine, particulate matter, and water. Clean synthesis gas 8 is split into two streams 9 and 10. Stream 9 can be used to fuel a combined cycle gas turbine/steam turbine unit 11 for generating electrical power for base-load requirements. The other synthesis gas stream 10 can be fed to a FT reactor 12 to produce stream 14 comprising liquid hydrocarbons, wax, water and tail gases. Tail gases 15a are separated from liquid hydrocarbons and water in unit 15. A part 16 of tail gas 15a can be fed to a gas turbine driven peak-load power generating unit 18 and a part 17 can be fed to the combined cycle gas turbine/steam turbine unit 11 for generating electrical power for base-load requirements. Naphtha 16a may be introduced into gas turbine-generator set 18.

During peak power demand times, the temperature of FT reactor 12 can be decreased by reducing the pressure of the saturated steam in the FT cooling coils 13. This action reduces the saturated steam temperature in the cooling coils thereby increasing the heat transfer from the slurry to the water/steam coolant. The lower slurry temperature can cause the FT reaction rate to decrease and reduce the conversion of synthesis gas to liquid hydrocarbons. Reduction of the conversion of synthesis gas to liquid hydrocarbons results in more unconverted synthesis gas to be present in the FT tail gases. The increased flow rate of tail gases 15a during operation at the decreased FT temperature can increase the power output of generator 18. In one mode of operation, a portion 19 of tail gases 15a can be recycled to the FT reactor by combining with synthesis gases 10. The examples below illustrate the recycle of about 80% of the tail gases back to the inlet of the FT reactor under various operating conditions. However, it is possible to recycle from about 30% to about 90% of the tail gas to the FT unit during non-peak hours, or as long as the $H_2:CO$ ratio of the synthesis gas is in the range of about 0.7 to about 2.5.

CALCULATED EXAMPLES

The examples presented below are intended to elucidate the general aspects of the disclosed method. Gasifier performance is based on equations 1 through 4 above. A H:C molar ratio of about 0.828 and a carbon content of about 74 weight percent are used for Pittsburgh #8 coal. It is assumed that the synthesis gas has a $H_2:CO$ ratio of about 0.8. Based upon the values presented above, a coal feed rate of about 1000 tons per day can produce about 29.4 MMSCFD of $H_2$, about 36.7 MMSCFD of CO, and about 10.0 MMSCFD of $CO_2$. It is assumed that the carbon dioxide is removed upstream of the FT reactor. The disclosed examples all assume the same flowrates for $H_2$ and for CO as stated above.

The Fischer-Tropsch performance is based on proprietary in-house computer programs incorporating an iron-based catalyst. The FT model uses two chain growth parameters (alphas) to describe the carbon number distribution of the hydrocarbon product. The alphas relate moles of successive carbon numbers using the Anderson-Shultz-Flory procedure:

$$N_{n+1} = \alpha_1 N_n \text{ for } n<9 \tag{7}$$

$$N_{n+1} = \alpha_2 N_n \text{ for } n \geq 9 \tag{8}$$

In addition to reactor pressure and temperature, other key parameters specified for the FT model are CO conversion and moles of $CO_2$ produced per mole of CO converted.

For the disclosed examples, the wax produced is hydrocracked to produce diesel, naphtha and tail gases. The gas turbine efficiency was assumed to be about 38%. The calculated results for each disclosed example can be used to estimate peak power and diesel fuel production. It is assumed that peak power is produced for about 8 hours per day and that the base load power produced from tail gas is the same as that produced under high temperature operation, since the tail gas produced under high temperature operation must be utilized about 24 hours per day. Peak load power during an 8-hour period is provided by stored naphtha and by tail gas in excess of base load requirements. The amount of naphtha available during an 8-hour peak load operation is the sum of the naphtha production during high temperature operation for about 16 hours and during low temperature operation for about 8 hours.

Example 1a

This Example shows the calculated performance of the FT system operating at a high CO conversion and a high alpha for a single pass operation. The quantities of electrical power from tail gas and naphtha and diesel fuel producible under the stated operating conditions are set forth in Table 1. For this example, the following FT parameters are considered:

| Pressure = 2.8 MPa | Temperature = 255° C. |
|---|---|
| $\alpha_1$ = 0.69 | $\alpha_2$ = 0.955 |
| CO Conversion = 85% | $CO_2$ Productivity = 0.42 |

Example 1b

This example shows the effect of recycling 80% of the tail gas under the operating conditions of Example 1a. The resulting quantities of tail gas, naphtha, which represent the amount of electrical power producible, with diesel fuel are set forth in Table 1.

TABLE 1

| | Quantity | |
|---|---|---|
| FT Product | No TG Recycle Example 1a | 80% TG Recycle Example 1b |
| Tail Gas ($Mw_e$) | 23.2 | 14.0 |
| Naphtha($Mw_e$) | 13.0 | 14.8 |
| Diesel (BPD) | 1598 | 1816 |

Example 2a

This Example shows the calculated performance of the FT system operating at a lower temperature and therefore at a lower CO conversion, but with a high alpha catalyst as assumed in Example 1. The quantities of electrical power, represented by the tail gas and naphtha values, and diesel fuel producible under the stated operating conditions are set forth in Table 2. For this example, the following FT parameters are considered:

| Pressure = 2.8 MPa | Temperature = 225° C. |
|---|---|
| $\alpha_1$ = 0.69 | $\alpha_2$ = 0.965 |
| CO Conversion = 22% | $CO_2$ Productivity = 0.35 |

Example 2b

This Example shows the effect of recycling 80% of the tail gases back to the inlet of the FT reactor under the operating conditions of Example 2a. The resulting quantities of tail gas, naphtha, which represent the amount of electrical power producible, with diesel fuel are set forth in Table 2.

TABLE 2

| | Quantity | |
|---|---|---|
| FT Product | No TG Recycle Example 2a | 80% TG Recycle Example 2b |
| Tail Gas ($Mw_e$) | 71.8 | 38.3 |
| Naphtha($Mw_e$) | 3.6 | 9.6 |
| Diesel (BPD) | 493 | 1309 |

Example 3

This Example shows the calculated performance of the FT system operating with a low alpha catalyst at a high temperature. The quantities of electrical power and diesel fuel producible under the stated operating conditions are set forth in Table 3. Because it appeared that in this case there would not be sufficient hydrogen to permit recycle of more than 20% of the tail gas, the recycle case was not considered. For this example, the following FT parameters are considered:

| Pressure = 2.8 MPa | Temperature = 255° C. |
|---|---|
| $\alpha_1$ = 0.70 | $\alpha_2$ = 0.70 |
| CO Conversion = 85% | $CO_2$ Productivity = 0.42 |

TABLE 3

| FT Product | No TG Recycle |
|---|---|
| Tail Gas ($Mw_e$) | 41.2 |
| Naphtha($Mw_e$) | 23.4 |
| Diesel (BPD) | 380 |

Example 4a

This Example shows the calculated performance of the FT system operating at a lower temperature and therefore at a lower CO conversion, and also with a low alpha catalyst. The calculated values for electrical power from tail gas and naphtha and the amount of diesel fuel producible under the stated operating conditions are set forth in Table 4. For this example, the following FT parameters are considered:

| Pressure = 2.8 MPa | Temperature = 225° C. |
|---|---|
| $\alpha_1$ = 0.71 | $\alpha_2$ = 0.71 |
| CO Conversion = 22% | $CO_2$ Productivity = 0.35 |

Example 4b

This Example shows the effect of recycling 80% of the tail gases back to the inlet of the FT reactor under the operating conditions of Example 4a. The calculated quantities of tail gas, naphtha, and diesel fuel are set forth in Table 4.

TABLE 4

| | Quantity | |
|---|---|---|
| FT Product | No TG Recycle Example 1a | 80% TG Recycle Example 1b |
| Tail Gas ($Mw_e$) | 77.1 | 53.2 |
| Naphtha($Mw_e$) | 6.9 | 17.9 |
| Diesel (BPD) | 122 | 307 |

As stated above, Egan U.S. Pat. No. 3,986,349 teaches an integrated process for generating electrical power using gasification of solid carbonaceous material and FT technology. Egan's conventional method produces base-load power from gasifier gases and FT tail gases and supplemental power for peak-load demand from stored liquid hydrocarbons from the FT system. In Table 5 the advantage of using the instant method over the conventional method taught by the Egan '349 patent is shown in terms of increased peak power production for the high temperature and high alpha case. Utilizing the instant method of lowering the temperature provides for more synthesis gas for peak power. A smaller quantity of diesel is formed due to conservation of energy.

TABLE 5

| FT Output | High Temperature Only | High and Low Temperature Operation |
|---|---|---|
| Base Power (Mwe) | 23.2 | 23.2 |
| Peak Power (Mwe) | 39.0 | 78.1 |
| Diesel (BPD) | 1598 | 1229 |

Figure 2:
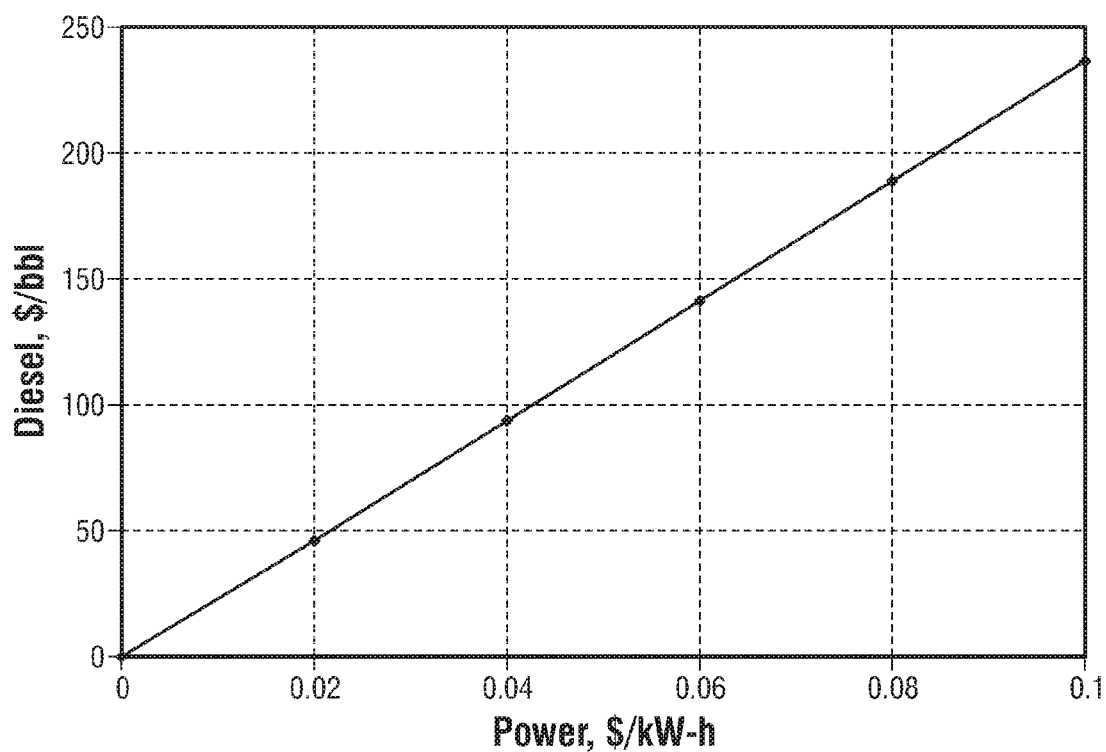
FIG. 2 is a plot diagram of the price of diesel versus the price of peak power.

The decision to employ diesel as well as naphtha for the production of power is an economic issue. FIG. 2 is a plot of diesel price in US$ per barrel versus the price of peak power in US$ per kilowatt-hour, which balances the revenues from the additional 39.1 Mwe of power against the loss of 369 BPD of diesel based on the data in Table 5.

In the case of a recycle operation, there would be less tail gas available for supplying base load because the tail gas is recycled to the inlet of the FT reactor during non-peak hours. During peak load operation tail gas recycle would be terminated, thereby providing a larger amount of tail gas for generating peak load power. The Egan '349 patent uses stored naphtha to provide peak power.

In Table 6 the advantage of using the instant method over the conventional method taught by Egan in the '349 patent is shown in terms of increased peak power production for the high alpha case wherein 80% of the tail gas is recycled to the inlet of the FT reactor during non-peak hours. Table 6 also shows the values associated with not only lowering the temperature but also curtailing the tail gas recycle. In this case, more tail gas is provided to the gas turbine for peak power. A smaller quantity of diesel is formed due to conservation of energy.

TABLE 6

| FT Output | High Temperature 80% Recycle | High and Low Temperature 80% Recycle | High and Low Temperature No Recycle |
|---|---|---|---|
| Base Power (Mwe) | 14.0 | 14.0 | 14.0 |
| Peak Power (Mwe) | 44.3 | 63.5 | 90.9 |
| Diesel (BPD) | 1816 | 1647 | 1375 |

The disclosed method exploits the benefits of a Fischer-Tropsch system comprising an air separation unit for producing a stream of oxygen, a feedstock preparation unit, a gasification unit for reacting feedstock, oxygen and steam to produce synthesis gas comprising primarily hydrogen and carbon monoxide, a synthesis gas purification unit for removing sulfur and other impurities from synthesis gas, a combined cycle power production unit fueled by synthesis gas, a Fischer-Tropsch unit for producing liquid hydrocarbons and tail gases comprised of unreacted synthesis gas and gaseous hydrocarbons, and a gas turbine-generator set fueled by Fischer-Tropsch tail gases, and maximizes the system for electrical power production. Typical gasifier feedstock can comprise coal, petroleum coke, saw dust, sewage sludge, agricultural waste, and/or other energy crop. Not only is cleaned synthesis gas used to fuel a combined cycle gas turbine/steam turbine unit for generating electrical power for base-load requirements, the synthesis gas can serve as feed for a FT reactor to produce liquid hydrocarbons, wax, water and tail gases. Typical FT catalysts comprise iron, cobalt, nickel, and/or ruthenium. Some of the FT tail gas may then be fed to a gas turbine driven peak-load power generating unit. It may also be used as feed for a combined cycle gas turbine/steam turbine unit for generating electrical power for base-load requirements.

When desired, and especially during peak power demand times, the temperature of the FT reactor may be decreased to bring about an increase in power output of the generator. Lowering the pressure of the saturated steam in the reactor cooling coils reduces the temperature of the saturated steam temperature, which thereby results in a lower slurry temperature. When the FT reaction rate decreases, thereby reducing the conversion of synthesis gas to liquid hydrocarbons, more unconverted synthesis gas is present in the FT tail gases and available as feed for the gas turbine driven power generating unit. The power produced in the power generating unit is variable to meet varying electrical load requirements. The FT reactor may range in temperature from about 190° C. and 275° C.

The disclosed method can also be used to maximize an existing power generation system and smooth out fluctuations in power production. For example, an FT system can be integrated with an electrical power production facility comprising electrical power generator 22 powered, for example, by wind turbines or solar cells. Although a wind powered facility is described here, other types of electric power production facilities, alternative or conventional, may be integrated with the disclosed method.

While a number of exemplifying features and embodiments have been discussed above, those of skill in the art will recognize certain modifications, permutations, additions and subcombinations thereof. No limitation with respect to the specific embodiments disclosed herein is intended or should be inferred.

We claim:

1. A process for smoothing out fluctuating power produced by a power production facility which is subject to wide variability in energy source, said method comprising the steps of:
    integrating said power production facility with one or more gas turbine-generator sets and a hydrocarbon production facility comprising at least one Fischer-Tropsch (FT) reactor;
    said hydrocarbon production facility further comprising a gasification unit and a gas purification unit;
    wherein said gasification unit reacts feedstock, oxygen and steam for producing a substantially constant flow rate of synthesis gas comprising primarily hydrogen and carbon monoxide;
    wherein said gas purification unit removes sulfur and other impurities from said synthesis gas, thereby forming a cleaned synthesis gas;
    introducing a substantially constant flow rate of a first portion of said cleaned synthesis gas into said at least one FT reactor, thereby forming liquid hydrocarbons, naphtha and a FT tail gas comprising unconverted synthesis gas and gaseous hydrocarbons;
    operating said at least one FT reactor at decreased reaction rate, while maintaining said substantially constant flow rate of said first portion of said cleaned synthesis gas, thereby causing an increased amount of unconverted synthesis gas to be present in the FT tail gas;
    fueling a combined cycle power production unit with a second portion of said cleaned synthesis gas to provide a base load requirement;
    fueling the one or more gas turbine-generator sets with a portion of FT tail gas rich in unconverted synthesis gas to provide base electrical power, thereby smoothing out power production over time.

2. The process of claim 1, wherein said power production facility comprises at least one electrical power generator powered by wind turbine.

3. The process of claim 1, wherein said power production facility comprises at least one electrical power generator powered by solar cells.

4. The process of claim 1, wherein said hydrocarbon production facility further comprises a feedstock preparation unit to convert feedstock into a pumpable slurry.

5. The process of claim 1, wherein the gasifier feedstock is carbon-bearing.

6. The process of claim 1, wherein the gasifier feedstock is selected from the group consisting of coal, petroleum coke, saw dust, sewage sludge, agricultural waste, and an energy crop.

7. The process of claim 1, wherein said FT reactor comprises a catalyst to promote the formation of predominantly hydrocarbons having more than five carbon atoms, said catalyst being selected from the group consisting of iron, cobalt, nickel, and ruthenium.

8. The process of claim 1 further comprising the step of increasing or decreasing the amount of FT tail gas supplied to the one or more gas turbine-generator sets, thereby varying the power generated by the one or more gas turbine-generator sets to offset variances in electrical power output of the power production facility.

9. The process of claim 8, wherein the increase or decrease in tail gas results from changing the operating temperature of said FT reactor.

10. The process of claim 9, wherein the temperature of said FT reactor varies between about 190° C. and about 275° C.

11. The process of claim 1, wherein operating said at least one FT reactor at decreased reaction rate comprises decreasing the temperature of said FT reactor by reducing the pressure of the saturated steam in cooling coils in said FT reactor.

12. The process of claim 1, wherein the step of decreasing the temperature of said FT reactor further comprises increasing heat transfer from a FT reactor slurry to a water/steam coolant housed in said FT reactor.

13. The process of claim 1, wherein said hydrocarbon production facility further comprises an air separation unit for producing a stream of oxygen for use in said gasification unit.

14. The process of claim 1, wherein an increase or decrease in naphtha results from changing the operating temperature of said FT reactor.

15. The process of claim 1, wherein naphtha from said FT reactor is utilized as a variable fuel for the one or more gas turbine-generator sets.

\* \* \* \* \*